United States Patent [19]

Bernhardt et al.

[11] 4,161,550

[45] Jul. 17, 1979

[54] MEAT AROMA PRECURSOR COMPOSITION

[75] Inventors: Christian A. Bernhardt, Fairfield; Marvin J. Mohlenkamp, Jr., Colerain Township, Hamilton County, both of Ohio

[73] Assignee: The Procter & Gamble Company, Cincinnati, Ohio

[21] Appl. No.: 835,126

[22] Filed: Sep. 21, 1977

[51] Int. Cl.² ............................................. A23L 1/231
[52] U.S. Cl. .................................... 426/533; 426/656; 426/657
[58] Field of Search ................ 426/533, 656, 657, 652

[56] References Cited

U.S. PATENT DOCUMENTS

| | | | |
|---|---|---|---|
| 3,394,015 | 7/1968 | Giacino | 426/533 |
| 3,519,437 | 7/1970 | Giacino | 426/533 |
| 3,773,523 | 11/1973 | Chhuy et al. | 426/656 X |
| 3,930,044 | 12/1975 | Rovaart et al. | 426/533 |
| 3,940,500 | 2/1976 | Sortwell | 426/535 |
| 3,965,268 | 6/1976 | Stocker et al. | 426/656 X |

OTHER PUBLICATIONS

Pippen et al., *J. of Food Science,* "Origin of Hydrogen Sulfide in Heated Chicken Muscle," vol. 29, (1964), p. 393–399.

Minor et al, *J. Agr. Food Chem.,* "Chicken Flavor Studies," vol. 14, No. 4, (1966), pp. 416–419.

*Primary Examiner*—Raymond N. Jones
*Assistant Examiner*—Esther M. Kepplinger
*Attorney, Agent, or Firm*—Leonard Williamson; Rose Ann Dabek; Richard C. Witte

[57] ABSTRACT

An aroma precursor composition comprising: a hydrogen sulfide precursor, preferably cysteine; a dimethyl sulfide precursor, preferably S-methyl methionine; and an edible proteinaceous material, preferably soy protein. Upon heating or cooking in the presence of water, the precursor composition generates an aroma surprisingly reminiscent of cooked beef. Preferably, the precursor composition is substantially dry until ready to cook, then an effective amount of water is added thereto, whereby, upon cooking the aroma is generated in situ.

14 Claims, No Drawings

MEAT AROMA PRECURSOR COMPOSITION

FIELD OF THE INVENTION

The present invention relates to a meat-like aroma precursor composition and to a method for generating meat-like aromas.

THE PRIOR ART

Much research and development effort has been spent in pursuit of substances capable of imparting authentic meat-like aroma to foodstuffs such as meat analogs. Often, the results of such research have been disappointing either because the aroma compositions are too expensive or the aromas generated therefrom are not authentic.

The amino acid, cysteine, has often been employed in processes for making "meaty" flavors. E.g., cysteine has been reacted with fractionated wood smoke (U.S. Pat. No. 2,918,376, Dec. 22, 1959 to May et al.); with a furan compound (U.S. Pat. No. 2,934,435, Apr. 26, 1960 to May); with glyceraldehyde (U.S. Pat. No 2,934,436, Apr. 26, 1960 to May et al.); and with a pentose or hexose monosaccharide (U.S. Pat. No. 2,934,437, Apr. 26, 1960 to Morton et al.). Cysteine is also found in more complex reaction flavors such as those taught in U.S. Pat. Nos. 3,365,306, Jan. 23, 1968 to Perret; 3,615,698, Oct. 26, 1971 to Thomas; 3,615,600, Oct. 23, 1971 to Tonsbuk; 3,493,395, Feb. 3, 1970 to Soeters and 3,532,514, Oct. 6, 1970 to May.

Also, U.S. Pat. No. 3,394,015, July 23, 1968 to Giacino (International Flavors & Fragrances, Inc.) teaches a process for preparing a "meaty" flavor and aroma by reacting, in the absence of a monosaccharide, a proteinaceous substance and a sulfur-containing compound, e.g., cysteine.

S-methyl methionine has also been taught to impart flavor to foodstuffs. In U.S. Pat. No. 3,940,500, Feb. 24, 1976 to Sortwell, a comestible material, such as seafood, is provided with a scallop flavor by addition of compound containing a dimethylthio group, such as S-methyl methionine salt.

However, free dimethyl sulfide and hydrogen sulfide tend to be unstable as food additives. Literally hundreds of other additives are taught to improve the flavor and/or the aroma of meat analogs and other foodstuffs—some of which are taught in combination with either dimethyl sulfide or hydrogen sulfide or a precursor of one or the other.

So, it remained for the present inventors, however, to discover that the particular combination of cysteine, proteinaceous material, and S-methyl methionine develops an authentic beef-like aroma superior to either one alone under homecooking conditions which is surprisingly similar to that generated by natural beef under the same conditions. Hence, it is one of the objects of the present invention to provide an aroma-precursor composition which can be used to generate a beef-like aroma. It is also an object of this invention to provide a method by which beef-like aromas can be generated in edible materials under home-cooking conditions. It is yet another object of this invention to provide a surprisingly authentic beef-like aroma from practical and inexpensive starting materials.

Still another object of this invention is to provide a stable aroma-precursor in a foodstuff which, upon cooking, generates a meat-like aroma.

SUMMARY OF THE INVENTION

The present invention relates to a meat-aroma precursor composition which generates a meat-like aroma comprising:
A. a hydrogen sulfide precursor selected from the group consisting of cysteine, edible salts of cysteine, gluthathione, edible salts of glutathione, edible protein-containing sulfhydryl and cystine; preferably cysteine;
B. a dimethyl sulfide precursor selected from the group consisting of edible salts and derivatives of: S-methyl methionine, S-methyl-4-methyl thiobutyric acid, S-methyl-methyl cysteine, S-methyl-3-methyl thiopropionic acid, and S-methyl-methyl thioacetic acid; preferably S-methyl methionine; and
C. an edible proteinaceous material, preferably soy protein;
wherein said hydrogen sulfide precursor, said dimethyl sulfide precursor and said proteinaceous material are present in amounts effective to generate a meat-like flavor and aroma, upon heating said precursor in the presence of an effective amount of water.

When cooked, the precursor composition generates an aroma surprisingly similar to that of cooked beef. It is contemplated that the precursor composition will be used in combination with other foodstuff materials and flavorants which will also generate a meat-like flavor and/or modify and enhance the aroma of the precursor composition when cooked by the consumer. It is one of the advantages of the aroma precursor composition that a meat-like aroma is generated therefrom under normal home-cooking conditions.

DESCRIPTION OF THE PREFERRED EMBODIMENTS

A precursor composition, useful for generating meat-like aroma, preferably comprises:
A. a hydrogen sulfide precursor, e.g., a hydrogen sulfide precursor selected from the group consisting of cysteine; edible salts of cysteine, and edible thiazolidine;
B. a dimethyl sulfide precursor, e.g., a dimethyl sulfide precursor selected from the group consisting of S-methyl methionine and edible derivatives of S-methyl methionine, hardstock encapsulated dimethyl sulfide; and
C. an edible proteinaceous material whereby, upon heating said precursor composition in the presence of water, said meat-like aroma is synergistically generated. The precursor composition may be added to food, e.g., ground beef or it may be used as a food itself.

Most preferably, the hydrogen sulfide precursor is cysteine and the dimethyl sulfide precursor is S-methyl methionine. The amounts of hydrogen sulfide and dimethyl sulfide precursor materials utilized in the precursor compositions of the invention are not critical but should be sufficient to generate, upon heating in water in the presence of an edible proteinaceous material, a beef-like aroma. It will be appreciated that amounts of such precursors will depend upon the particular nature of the respective precursor material employed. In general, an amount of cysteine for the aroma precursor composition of about 100 to about 50,000 parts per million (ppm) per part of proteinaceous material (on a dry-weight basis) and an amount of S-methyl methionine of from about 0.25 ppm to about 700 ppm will be suited to the provision of beef-like aroma. Preferred amounts of cysteine and S-methyl methionine are, respectively, 1,000–50,000 ppm and 50–200 ppm; and most preferably 2,000–15,000 ppm of cysteine and 25–175 ppm of S-methyl methionine per part of proteinaceous material on a dry-weight basis.

Of course, the dimethyl sulfide precursor of the present invention must be edible. As used herein, dimethyl sulfide precursors include compositions which generate, physically or chemically, dimethyl sulfide. Dimethyl sulfide encapsulated in hardstock, e.g., fatty acid material having a melting point of about 60° C., is an acceptable dimethyl sulfide precursor. As used herein, derivatives of S-methyl methionine and S-methyl-methyl cysteine include N-alkyl amides, N-alkyl amides, and alkyl esters and alkyl amides thereof. As used herein, derivative of S-methyl-4-methyl thiobutyric, S-methyl-thiproprionic and S-methyl thioacetic acids are defined as the alkyl or aryl esters or amides thereof. Suitable salts are the chloride, bromide and iodide, and S-methyl methionine chloride is the most preferred salt.

The cysteine reactant of the present invention must be edible and may be in either salt or free-base form. D-cysteine, L-cysteine, DL-cysteine, cysteine hydrochloride or other edible salts of cysteine may be used. It is also contemplated that precursors of cysteine may also be employed, particularly, edible substituted thiazolidines. Edible substituted thiazolidines selected from the group consisting of reducing sugar thiazolidines, aldehyde thiazolidines, and ketone thiazolidines are stable precursors of cysteine and are preferred. Edible protein-containing sulfhydryls include egg white and other proteins which contain sulfhydryl groups.

Proteinaceous materials suitable for use in the aroma precursor composition include edible proteins such as those derived from vegetable protein sources, e.g., soybeans, sunflower seeds, safflower seeds, corn, peanuts, wheat, peas, cottonseeds, coconut, rapeseed, sesame seed, leaf proteins and single-cell proteins, such as yeast. Since meat analog products are generally made from proteinaceous material, the protein of the meat analog itself can serve as the proteinaceous substance required in this invention. Animal protein sources can also be used. They include milk, egg, poultry, meat and fish. It has been found that the protein can be heat-coagulable or not heat-coagulable and in denatured and undenatured form.

The method for generating a meat-like aroma of the present invention comprises the step of heating the precursor composition in an aqueous environment at a temperature of from 60° C. to 180° C. until a meat-like aroma is generated.

While it is not wished to be limited by any theory, it is believed that the aroma precursor composition of the present invention generates an improved, meat-like aroma by, at least in part, producing dimethyl sulfide (DMS) and hydrogen sulfide upon cooking or heating in the presence of water. The generation of these compounds over the headspace of said heated precursor composition imparts a surprisingly authentic meat-like aroma superior to that generated by either a dimethyl sulfide or a hydrogen sulfide precursor alone. The proteinaceous material appears to have a catalytic effect on the development of the meat aroma.

Some of the advantages of the aroma precursor composition are that it is more shelf-stable than $H_2S$ or DMS impregnated foodstuffs, and when cooked, it can generate meat-like aroma synergistically superior to either component under home-cooking conditions. By home-cooking conditions, it is meant a temperature of between 60° C. and 180° C., typically 80–100° C., and heating times of from about 5 minutes to about 45 minutes. Thus, extremely high temperatures and extended heating times are not required to produce the aroma of this invention.

The aroma generated by the aroma precursor composition is reminiscent of lightly-cooked or rare beef. This aroma can be modified with other additives, e.g., the substituted thiazolidine carboxylic acids flavor precursors disclosed in U.S. Pat. application, Ser. No. 780,372, filed Mar. 23, 1977, Raczynski et al. (herein incorporated by reference in its entirety).

The aroma precursor composition can be added to any of a variety of foodstuff materials desirably imparted with a meat-like aroma. Thus, the precursor composition will find applicability in food products such as meats, real or synthetic, starch-based food products or the like. A preferred application will be as a meat-flavor precursor for meat analog products from vegetable protein. Examples of such products include vegetable protein meat extenders, comminuted or chunk-type vegetable protein meat analogs. The aroma precursor of this invention, when used in combination with additional taste and flavor ingredients, may organoleptically enhance the aromatic properties of edible compositions such as those disclosed in U.S. Pat. No. 3,394,015, July 23, 1968, to Chrisptopher Giacino (herein incorporated by reference in its entirety). While the aroma precursor of this invention provides a beef-like aroma similar to that of cooked beef, it is contemplated that additional taste enhancers and flavor ingredients will be used in combination with the aroma precursor to provide, modify or enhance the taste and flavor of a foodstuff. Thus, flavor and taste additives, e.g., amino acid flavorants, onion flavor, garlic, inorganic salts, pepper sage, organic acids, nucleotide flavorants, etc., should be employed in addition to the aroma precursor composition to obtain a tasty, flavorful foodstuff with the authentic beef-like aroma provided by this invention.

Additional aroma modifier may also be used in combination with the aroma precursor of this invention, e.g., minor amounts of lower saturated and unsaturated alkyl aldehydes, such as acetaldehyde, butyraldehyde, valeraldehyde, propanal, and heptanal and the like. Lower alkyl ketones may also be used as aroma modifiers. These additional materials may be used in combination with the present invention so long as they have a positive effect on the flavor or aroma of the final product. The above additional aroma modifiers are not essential but are helpful in the production of certain desired authentic beef-like aromas.

While not essential to the process of this meat-like aroma invention, but preferable from the standpoint of simulating some beef products, vegetable and animal fats or combinations of such fats are normally added to the precursor composition in order to raise the fat content of the protein fiber. The fat content is adjusted to simulate a beef meat product. The type of fat is often selected for reasons of market objectives and the like. For instance, a vegetable fat such as cottonseed oil can be used when an unsaturated fat is desired for simulating meat containing no animal products. Where there is no objection to the use of an animal fat, such fats may be incorporated into the fiber to achieve the desired fat level. Other ingredients such as flavoring agents, coloring, seasoning, and the like can also be added to the fat composition to simulate a beef product.

The following examples are offered to illustrate the present invention but not to act as a limitation thereof:

EXAMPLE I

An aroma precursor composition was prepared by first preparing a dimethyl sulfide precursor by adding 0.0468 grams of S-methyl methionine to 52 grams of bland, dry (4% moisture) soy protein granules. These were mixed in 138 ml. of water and allowed to hydrate and were then freeze-dried. About 1.41 parts of said freeze-dried dimethyl sulfide precursor granules were mixed with 51.2 parts bland soy protein, 23.0 parts of Fri-al ™ (mixed animal-vegetable fat) and 0.18 parts of L-cysteine hydrochloride monohydrate.

This precursor composition was cooked by boiling 145 ml. of water and mixing said composition therein. The mixture was removed from the heat, stirred and covered for 5 minutes and evaluated. Expert sniffers described the head-space aroma as beef-like.

EXAMPLE II

Evaluation of Aroma Cysteine, SMM and Protein Precursor Composition

Three samples were prepared (see Table I).

TABLE I

| Sample | Bland soy protein(g) | 1-cysteine(g) free base | SMM soln. 1 mg./ml. | Fri-al$^T$ Fat | Water (ml.) (Charcoal filtered) |
|---|---|---|---|---|---|
| 45 | 6.0 | .12 | — | 2.6 | 16.5 |
| 86 | 6.0 | — | 3.5 | 2.6 | 13.0 |
| 32 | 6.0 | .12 | 3.5 | 2.6 | 13.0 |

All the ingredients were placed in a ½-pint jar, mixed with a spatula, covered with lids, heated at a boil for 10 minutes, then placed on a 70° C. warming tray for an additional 10 minutes. The aroma of the samples was then evaluated by experts, see Table 1A.

TABLE 1A

| Sample | Cysteine alone (45) | SMM alone (86) | Combination (32) |
|---|---|---|---|
| Aroma intensity | $\overline{X} = 6.0$ | $\overline{X} = 5.4$ | $\overline{X} = 6.4$ |
| Meat-like intensity | $\overline{X} = 3.0$ | $\overline{X} = 3.4$ | $\overline{X} = 4.4$ |
| Off-aroma intensity | $\overline{X} = 4.8$ | $\overline{X} = 3.8$ | $\overline{X} = 3.8$ |

All the samples were evaluated within 45 minutes of their preparation. It will be appreciated that Sample 32 had the best overall meat-like aroma impression and was tied with Sample 86 for off-like aroma. A scale of 1 to 9 was used. $\overline{X}$ is the mean value of the intensity ratings. The experts found Sample 32 to have a more intense meat-like aroma than samples containing either cysteine or SMM alone.

EXAMPLE III

Evaluation of the Effect of Fat on Aroma of Cysteine, SMM and Protein Precursor Composition Three samples were prepared:

TABLE II

| Sample | Bland soy protein | 1-cysteine (g) free base | SMM soln. (ml) 1 mg./ml. | Fat | Water (ml.) (Charcoal filtered |
|---|---|---|---|---|---|
| 39 | 6.0 | .12 | 3.5 | — | 13.0 |
| 27 | 6.0 | .12 | 3.5 | Fri-al$^T$ 2.8 | 13.0 |
| 61 | 6.0 | .12 | 3.5 | Veg. Oil 2.8 | 13.0 |

All the ingredients were placed in a ½-pint jar, mixed with a spatula, covered with lids, heated at a boil for 5 minutes, then placed on a 70° C. warming tray for 15 minutes. The aroma of the samples was evaluated as in Example II.

TABLE IIA

| Sample | 39 (Blank) | 27 (Fri-al$^T$ Fat) | 61 (Veg. Oil) |
|---|---|---|---|
| Aroma intensity | $\overline{X} = 5.4$ | $\overline{X} = 5.4$ | $\overline{X} = 5.2$ |
| Meat-like intensity | $\overline{X} = 3.00$ | $\overline{X} = 4.6$ | $\overline{X} = 2.6$ |
| Off Aroma intensity | $\overline{X} = 4.6$ | $\overline{X} = 4.0$ | $\overline{X} = 5.2$ |

Fri-al ™ is a deodorized animal-vegetable fat blend comprising about 90% animal fat including beef tallow.

It will be appreciated that the Fri-al ™ fat enhanced the meat-like aroma of the precursor composition. All samples were evaluated within 45 minutes of the preparation.

EXAMPLE IV

Deflavored, texturized soy flakes were hydrated with water in the amounts shown in Table III. The cysteine and/or SMM were added to the water when used. After hydration, the soy flakes were thoroughly mixed with ground beef, shaped into ¼-pound patties and fried for 3 minutes on each side at 350° F. and evaluated by expert panelists for overall meatiness. "Overall meatiness" being defined as authentic meat texture and flavor which comprises taste and aroma.

TABLE III

| Sample | Ground Beef | Soy* Flakes | Water | Cysteine | SMM |
|---|---|---|---|---|---|
| 1 | 350** | 50 | 100 | .4 | — |
| 2 | 350 | 50 | 100 | .8 | — |
| 3 | 350 | 50 | 100 | — | .0125 |
| 4 | 350 | 50 | 100 | — | .0025 |
| 5 | 350 | 50 | 100 | .4 | .0125 |
| 6 | 350 | 50 | 100 | .4 | .0075 |
| 7 | 350 | 50 | 100 | .2 | .0075 |
| 8 | 350 | 50 | 100 | .15 | .005 |

*Deflavored texturized soy flakes modified with minor amounts of taste and gustatory ingredients.
**Amounts are in grams.

The expert panelists rated the samples which contained the precursor composition of this invention (Samples 5–8) over the other samples (1–4) for overall meatiness. It will also be appreciated that all of the samples have the same composition except for the variables, cysteine and SMM. It was also found that cysteine and SMM at the levels used in Sample 8 generated aroma but had no taste when tested with nose plugged.

What is claimed is:

1. A meat-like aroma precursor composition comprising:
   A. a hydrogen sulfide precursor;
   B. a dimethyl sulfide precursor; and
   C. an edible proteinaceous material wherein said hydrogen sulfide precursor, said dimethyl sulfide precursor, and said proteinaceous material are present in amounts effective to generate a meat-like aroma upon heating said precursor composition in an aqueous environment.

2. A precursor composition in accordance with claim 1 wherein:
   A. said hydrogen sulfide precursor is selected from the group consisting of cysteine, edible salts of cysteine, glutathione, edible salts of glutathione and edible protein-containing sulfhydryl and cystine;
   B. said dimethyl sulfide precursor is selected from the group consisting of edible salts and derivatives of: S-methyl methionine, S-methyl-4-methyl thiobutyric acid, S-methyl-methyl cysteine, S-methyl-3-methyl thiopropionic acid, and S-methyl-methyl thioacetic.

3. The composition of claim 2 wherein said composition includes an edible thiazolidine selected from the group consisting of reducing sugar thiazolidines, aldehyde thiazolidines, and ketone thiazolidines; wherein said thiazolidine is a stable precursor of said precursor cysteine.

4. The composition of claim 1 wherein said proteinaceous material is soy protein.

5. The composition of claim 1 wherein said hydrogen sulfide precursor is cysteine, and said dimethyl sulfide is S-methyl methionine; and wherein the effective amounts of said cysteine is from about 100 ppm to about 50,000 ppm per part of said proteinaceous foodstuff, and the amount of said S-methyl methionine is from about 0.25 ppm to about 700 ppm per part of said proteinaceous foodstuff.

6. The composition of claim 5 wherein said amount of said cysteine is about 1,000 ppm to about 15,000 ppm and said amount of S-methyl methionine is about 25 ppm to about 175 ppm.

7. The composition of claim 5 wherein the amount of said cysteine is from about 2,000 to about 5,000 ppm.

8. A method of generating a meat-like aroma in an edible proteinaceous material comprising the steps of cooking a precursor composition in an aqueous environment at a temperature of from about 60° C. to about 180° C. for about 5 to about 45 minutes, said precursor composition comprising:
   A. a hydrogen sulfide precursor;
   B. a dimethyl sulfide precursor; and
   C. an edible proteinaceous material, wherein said hydrogen sulfide precursor, said dimethyl sulfide precursor and said proteinaceous material are present in amounts effective to generate a meat-like aroma upon heating said precursor composition in an aqueous environment.

9. The method of claim 8 wherein said hydrogen sulfide precursor is selected from the group consisting of cysteine edible salts of cysteine, glutathione, edible salts of glutathione and edible protein-containing sulfhydryl and cystine; and said dimethyl sulfide precursor is selected from the group consisting of edible salts and derivatives of: S-methyl methionine, S-methyl-4-methyl thiobutyric acid, S-methyl-methyl cysteine, S-methyl-3-methyl thiopropionic acid, and S-methyl-methyl thioacetic.

10. The method of claim 9 wherein said hydrogen sulfide precursor is cysteine, and said dimethyl sulfide is S-methyl methionine; and wherein the effective amount of said cysteine is from about 100 ppm to about 50,000 ppm per part of said proteinaceous foodstuff, and the amount of said S-methyl methionine is from about 0.25 ppm to about 700 ppm per part of said proteinaceous material.

11. The method of claim 9 wherein said composition includes an edible thiazolidine selected from the group consisting of reducing sugar thiazolidines, aldehyde thiazolidines, and ketone thiazolidines; wherein said thiazolidine provides a stable precursor of said precursor cysteine.

12. The method of claim 8 wherein said proteinaceous material comprises soy protein.

13. The method of claim 8 wherein said precursor composition includes an amount of deodorized animal tallow effective to enhance the meat-like aroma of said precursor composition.

14. The method of claim 8 wherein said precursor composition includes an edible vegetable fat.

* * * * *